Figure 1:
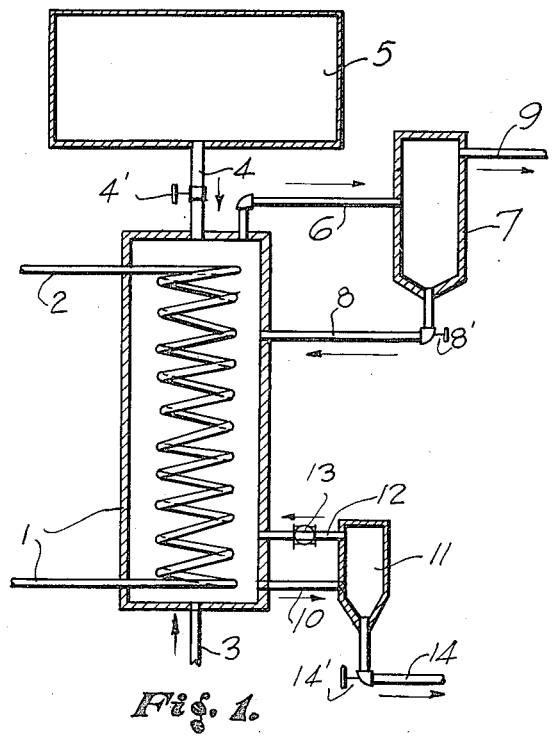

Nov. 11, 1924.

A. E. ROBERTS

PROCESS OF PRODUCING RESIN

Filed March 24, 1921

1,515,315

INVENTOR
Alfred E. Roberts
BY
Chas. W. Mortimer
ATTORNEY

Patented Nov. 11, 1924.

1,515,315

UNITED STATES PATENT OFFICE.

ALFRED E. ROBERTS, OF CORNWELLS HEIGHTS, PENNSYLVANIA, ASSIGNOR TO THE BARRETT COMPANY, A CORPORATION OF NEW JERSEY.

PROCESS OF PRODUCING RESIN.

Application filed March 24, 1921. Serial No. 455,295.

*To all whom it may concern:*

Be it known that I, ALFRED E. ROBERTS, a citizen of the United States, residing at Cornwells Heights, in the county of Bucks and State of Pennsylvania, have invented certain new and useful Improvements in Processes of Producing Resin, of which the following is a specification.

This invention relates to the process of producing resins from coal tar naphtha. These resins, commonly known as paracoumaron resin, are normally produced by the polymerization of polymerizable constituents, such as coumaron, indene and other resin-forming compounds in naphthas containing them, by treatment with small quantities of sulfuric acid, aluminum chloride or other polymerization agent, or by other treatments such as subjection to heat and pressure.

Heretofore it has been the practice in producing these resins from naphtha to introduce the polymerizing agent, such as sulfuric acid or aluminum chloride, into a batch of the naphtha while agitating the same, draw off the polymerizing agent after it was allowed to settle, neutralize the naphtha containing the resin in solution with an alkali, wash with water and then distill off the unpolymerized constituents, leaving the resin as a residue. This procedure is necessarily intermittent, another batch of naphtha being treated after the preceding batch has been polymerized, and so on for succeeding batches.

I have discovered that the naphtha may be more advantageously polymerized by a short contact of the naphtha with a relatively large quantity of the sulfuric acid than by a longer contact with a small quantity of the acid, as is the common method. This discovery may be taken advantage of either in a continuous process of polymerization, as more fully described below, or in a discontinuous process. I have found that if the naphtha be allowed simply to bubble up through strong sulfuric acid, the resin-forming compounds are polymerized and the naphtha, which then contains the polymerized products or resin in solution, may be immediately removed from the sulfuric acid, after which it is neutralized, washed and distilled, thus giving paracoumaron resin of high quality as the residue. This feature of my invention differs from the commonly used methods of polymerization with sulfuric acid or other agent in that the proportion of polymerizing acid to the naphtha in the mixture at any time is much larger than any heretofore used, and the results are much more satisfactory. The commonly used method employs a proportion of acid to naphtha in a ratio of about one part or less of acid to ten parts of naphtha by weight, whereas in my method of polymerization I use a very much larger proportion of acid to naphtha, say corresponding to a ratio of about ten parts or more of acid to one part of the polymerizable constituents in the naphtha by weight. With this large excess of polymerizing agent, the heat generated by the polymerization reaction may be completely absorbed by the specific heat of the polymerizing agent without undue rise in temperature. The specific heat of sulfuric acid from 50° Bé. to 60° Bé. is approximately 0.5°. The heat of reaction is approximately equal to 250 B. t. u. per pound of polymerizable constituents that are contained in the usual coal tar naphthas. Therefore, ten pounds of sulfuric acid would rise in temperature about 50° F. or 27.5° C., using such a proportion of acid to the polymerizable constituents. This, of course, neglects the effect of the naphtha present, the specific heat of which is approximately 0.3 to 0.4. These figures are used to illustrate and help to explain my invention and are not to be understood as limiting or restricting the same in any way. The heat of reaction of various polymerizable materials may vary, and the amounts of sulfuric acid used would also vary. I may even have present during the reaction many times as much acid as naphtha with satisfactory results; for instance, about 50 to 100 parts of acid to one of the polymerizable constituents in the naphtha may be used.

I am able to make the polymerization step a continual one so that the polymerized naphtha may be drawn off steadily or in a continuous stream. In practicing the invention I prefer to make the operation a continuous one by starting with a large volume of sulfuric acid and bubbling the naphtha through it from the bottom and taking it continuously off the top. This, however, is not the only method of continuously polymerizing that I contemplate employing, as will be indicated more fully below. The naphtha may, if desired, be neutralized in a continuous operation after it has been polymerized by bubbling it through a caustic soda solution, or by other means. The operation can be stopped from time to time to replenish the sulfuric acid, or the operation can be made to continue indefinitely, for example by running in fresh acid and drawing off the spent acid during the process in such a way that the direction of flow of the acid is countercurrent to the direction of the flow of the naphtha.

I have obtained very satisfactory results by operating the process described in this application at low temperature, as set forth in Miller Patent No. 1,360,665, of November 30, 1920, although this low temperature polymerization does not appear to be absolutely necessary in practicing the present invention. This feature can be carried out in my invention by cooling the acid contained in the polymerizing apparatus by suitable cooling coils or other means, the amount and specific heat of the acid being sufficiently great so that the heat of polymerization of the naphtha is immediately absorbed by the acid without any excessive rise in temperature. I would not generally consider a rise in temperature of less than 30° C. excessive. When operated in this way the process offers the advantage of taking care of the heat of reaction practically instantaneously, whereas in the commonly used process the reaction has to be made to proceed gradually enough to allow the heat to be removed from a relatively large body of naphtha as fast as it is produced by the reaction. The control of the reaction in order to produce this gradual polymerization in the old process is very difficult, the process generally working out so that during a few minutes of the period of polymerization the great bulk of the reaction takes place, throwing a very heavy load on the cooling system during this time, whereas during the remainder of the reaction period the cooling system will be working under capacity. Even with ideal control, however, this principle operates in such a way that, for example, using the same amount of cooling in both processes, 5000 gallons of the naphtha can be subjected to the polymerizing treatment in the same time in both processes, but in my process the reaction takes place in such a way that each portion of the naphtha may be exposed to the polymerization treatment for, say only one minute, while in the old process the entire bulk of the naphtha will be exposed to the polymerization treatment for an hour or more.

I have found that the rapid polymerization obtained by my process gives a resin of better quality in that the melting point is higher to the extent of about 20° C. and the color is lighter, both of which features render the product more valuable in the arts, particularly in varnish manufacture.

The invention will be understood by reference to the description and the accompanying drawings. The invention will be particularly described with the use of sulfuric acid as the polymerizing agent, but it is to be understood that other polymerizing agents may be similarly used without departing from the spirit and scope of the invention. In the drawings Fig. 1 is a side view partly in section of an arrangement of apparatus for carrying out the invention.

Figure 2:
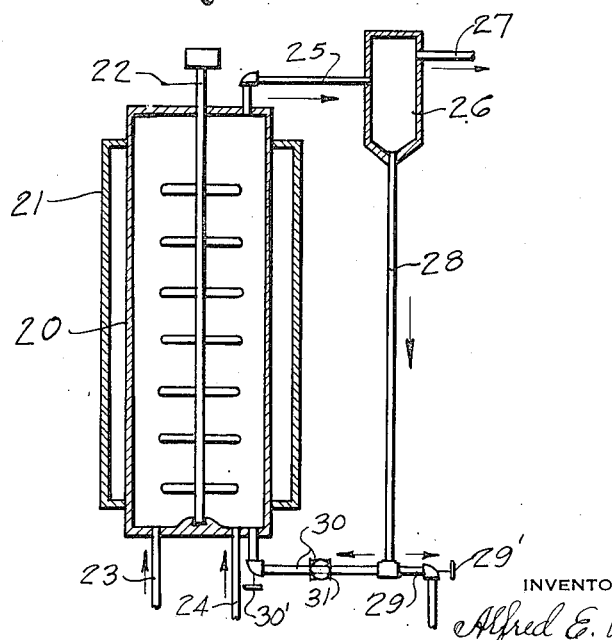

Fig. 2 is a similar view showing a modified apparatus and arrangement thereof.

In Fig. 1 reference character 1 refers to a vertical tank or vessel that is provided with a cooling coil 2. An inlet pipe 3 for naphtha leads from a source (not shown) to the bottom of the tank 1, and an inlet pipe 4, supplied with a valve 4', for sulfuric acid leads from the supply tank 5 to the top of the tank 1. A pipe 6 leads from the top of the tank 1 to the settling tank 7, from the bottom of which a pipe 8 leads through a valve 8' to an intermediate portion of the tank 1, and from near the top of tank 7 an outlet pipe 9 leads to a neutralizing tank or a still (not shown). A pipe 10 leads from the bottom of tank 1 to the settling tank 11, from the top of which tank 11 a pipe 12 having a pump 13 interposed therein, leads to an intermediate portion of the tank 1. An outlet pipe 14, supplied with a valve 14', leads from the bottom of tank 11 to a storage tank.

The operation is as follows:

Naphtha is fed through the pipe 3 into the bottom of the tank 1, which is supplied through the pipe 4 with sulfuric acid by opening the valve 4', and at the same time the temperature is maintained at the proper point by circulating cooling fluids through the cooling coil 2. The naphtha bubbles up through the sulfuric acid, during which time the polymerizable constituents therein become polymerized, and the naphtha containing the polymerized constituents or the resin in solution passes through the pipe 6 into the settling tank 7, possibly entraining some sulfuric acid, which acid settles to the bottom of the tank 7 and is permitted to flow back through the pipe 8 into the tank 1 while the naphtha containing the resin in solution passes out through the pipe 9, after which it may be neutralized and distilled for recovering the resin therefrom. The spent acid passes through the pipe 10 into the tank 11 where some naphtha may rise and be pumped through the pipe 12 by means of the pump 13 back into the tank 1. The spent acid may be withdrawn from the tank 11 through the pipe 14 to the storage tank.

In Fig. 2 is shown a tank or vessel 20 provided with a jacket 21 for cooling fluids, and a stirrer 22 driven in any convenient manner. A supply pipe 23 for naphtha and a supply pipe 24 for sulfuric acid lead to the bottom of the tank 20, and an outlet pipe 25 leads from the top of said tank to the settling tank 26. An outlet pipe 27 leads from the top of tank 26, and an outlet pipe 28 leads from the bottom of said tank, which pipe 28 branches into two branches, 29 and 30 respectively. The branch 29 is provided with a valve 29', and the branch 30 is provided with a pump 31 or any other means for moving liquids and leads back through the valve 30' into the bottom of tank 20.

The operation is as follows:

The proper proportions of naphtha containing polymerizable constituents and sulfuric acid, say about 100 parts by weight of sulfuric acid to 1 part by weight of the polymerizable constituents in the naphtha, are led through the pipes 23 and 24 into the bottom of tank 20 and are thoroughly agitated or mixed by means of the stirrer 22, the temperature being maintained at the proper point by circulating cooling fluids through the jacket 21. The mixture passes out of tank 20 through the pipe 25 into the settling tank 26 where the sulfuric acid settles to the bottom and passes through pipe 28 either back into the tank 20 through pipe 30 or through pipe 29 to a storage tank. The polymerized naphtha in settling tank 26, containing the polymerized constitutents or resin in solution, passes out through the pipe 27, after which it may be neutralized, washed and distilled for the recovery of resin therefrom.

It will be understood that in the operation of the process by the use of the apparatus shown in both illustrations, the process can be made continuous and the proportions of sulfuric acid to naphtha can be varied widely.

I claim:

1. The process of polymerization which comprises passing naphtha containing polymerizable constituents through a liquid polymerizing agent.

2. The process of polymerization which comprises passing in counter current relationship naphtha containing polymerizable constituents through a liquid polymerizing agent.

3. The process of polymerization which comprises treating naphtha containing polymerizable constituents with an amount of polymerizing agent sufficient to cause substantially complete and immediate polymerization, the potential capacity of said amount of polymerizing agent for absorbing of sensible heat being sufficient to prevent the heat of reaction from causing more than a 30° C. change in temperature.

4. The process of polymerization which comprises treating naphtha containing polymerizable constituents with a sufficiently large amount of a polymerizing agent to cause substantially complete and immediate polymerization and absorb the heat so as to prevent the heat of reaction from causing a change in temperature of more than 30° C., and removing the heat of reaction by cooling said agent.

5. The process of polymerization which comprises mixing naphtha containing polymerizable constituents with a polymerizing agent so that the weight of the said polymerizing agent in the system at any instant is more than 10 times the weight of the polymerizable constituents in said naphtha.

6. The process of polymerization which comprises mixing naphtha containing polymerizable constituents with sulfuric acid so that the weight of the sulfuric acid in the system at any instant is more than 10 times the weight of the polymerizable constituents in the said naphtha.

7. The process of polymerization which comprises treating naphtha containing polymerizable constituents with a sufficiently large amount of sulfuric acid to cause substantially complete and immediate polymerization and to prevent the heat of reaction from causing a change in temperature of more than 30° C.

8. The process of polymerizing coumaron and indene in naphtha which comprises treating the naphtha with sulfuric acid so that at least 10 times as much acid is present as coumaron and indene in the naphtha at any instant.

9. In the process of polymerization of naphthas containing coumaron and indene with sulphuric acid, the step which comprises preventing great rise in temperature by removing the heat of reaction by the heat absorbing capacity of the sulphuric acid and by cooling said acid.

In testimony whereof I affix my signature.

ALFRED E. ROBERTS.